(12) United States Patent
Shang

(10) Patent No.: US 10,288,799 B2
(45) Date of Patent: May 14, 2019

(54) OPTICAL ASSEMBLY, BACKLIGHT AND DISPLAY DEVICE

(71) Applicants: BOE TECHNOLOGY GROUP CO., LTD., Beijing (CN); BOE OPTICAL SCIENCE AND TECHNOLOGY CO., LTD., Jiangsu (CN)

(72) Inventor: Gaowei Shang, Beijing (CN)

(73) Assignees: BOE TECHNOLOGY GROUP CO., LTD., Beijing (CN); BOE OPTICAL SCIENCE AND TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 15/941,276

(22) Filed: Mar. 30, 2018

(65) Prior Publication Data

US 2019/0079242 A1    Mar. 14, 2019

(30) Foreign Application Priority Data

Sep. 11, 2017   (CN) .................... 2017 2 1163072 U

(51) Int. Cl.
*F21V 8/00* (2006.01)
(52) U.S. Cl.
CPC ......... *G02B 6/0088* (2013.01); *G02B 6/0053* (2013.01)

(58) Field of Classification Search
CPC .... G02B 6/0088; G02B 6/0053; G02B 6/005; G02B 6/0051; G02F 1/133606; G02F 1/133608; G02F 2001/133607
See application file for complete search history.

(56) References Cited

U.S. PATENT DOCUMENTS

| 6,846,089 | B2 * | 1/2005 | Stevenson | G02B 5/045 349/61 |
| 7,929,072 | B2 * | 4/2011 | Oohira | G02F 1/133308 252/299.3 |
| 9,645,442 | B2 * | 5/2017 | Liu | G02F 1/133602 |
| 2018/0321436 | A1 * | 11/2018 | Chang | G02B 6/0051 |

* cited by examiner

*Primary Examiner* — Peggy A Neils
(74) *Attorney, Agent, or Firm* — Nath, Goldberg & Meyer; Joshua B. Goldberg

(57) ABSTRACT

There are provided an optical assembly, a backlight and a display device. The optical assembly includes a diffusion sheet, a lower prism sheet and an upper prism sheet stacked sequentially, a surface of the diffusion sheet facing the lower prism sheet serves as a light exit surface, at least one edge of the light exit surface is provided with a adhesive strip, a side surface of the lower prism sheet facing the adhesive strip is provided with at least one protrusion, the side surface of the protrusion cooperates with the surface of the lower prism sheet facing the adhesive strip to form an avoidance slot; orthographic projections of the upper prism sheet and the adhesive strip on the light exit surface do not overlap with each other, orthographic projections of the upper prism sheet and the protrusion on the light exit surface do not overlap with each other.

15 Claims, 3 Drawing Sheets

OPTICAL ASSEMBLY, BACKLIGHT AND DISPLAY DEVICE

CROSS-REFERENCE TO RELATED APPLICATION

This application claims priority to Chinese Patent Application No. 201721163072.3 filed on Sep. 11, 2017, the contents of which are hereby incorporated by reference in its entirety as part of this application.

TECHNICAL FIELD

The present disclosure relates to the field of display technology, and in particular to an optical assembly, a backlight and a display device.

BACKGROUND

Currently, ultra-thin, high-brightness, narrow bezels and even bezel-less displays are used as displays of smart phones. However, undesirable phenomena such as side bright line, mura, displacement of films have limited the development of backlight of the smart phone.

SUMMARY

The present application provides an optical assembly, comprising a diffusion sheet, a lower prism sheet and an upper prism sheet stacked sequentially, a surface of the diffusion sheet facing the lower prism sheet serving as a light exit surface, wherein at least one edge of the light exit surface is provided with an adhesive strip, a side surface of the lower prism sheet facing the adhesive strip is provided with at least one protrusion, a side surface of the protrusion cooperates with the surface of the lower prism sheet facing the adhesive strip to form an avoidance slot, so that the adhesive strip passes through the lower prism sheet in a thickness direction of the lower prism sheet; an orthographic projection of the upper prism sheet on the light exit surface does not overlap with an orthographic projection of the adhesive strip on the light exit surface, and the orthographic projection of the upper prism sheet on the light exit surface does not overlap with an orthographic projection of the protrusion on the light exit surface.

In some embodiments, the at least one protrusion includes two protrusions, and opposite side surfaces of the two protrusions cooperate with the surface of the lower prism sheet facing the adhesive strip to form the avoidance slot.

In some embodiments, the adhesive strip is adhered to the opposite side surfaces of the two protrusions and the surface of the lower prism sheet facing the surface of the adhesive strip.

In some embodiments, a top surface of the adhesive strip is substantially flush with a surface of the upper prism sheet distal to the diffusion sheet.

In some embodiments, a side of the upper prism sheet distal to the diffusion sheet is provided with a light shielding tape.

In some embodiments, the light shielding tape adheres the adhesive strip adhered to the diffusion sheet, the protrusions of the lower prism sheet, and the side of the upper prism sheet distal to the light exit surface.

In some embodiments, a side surface of the upper prism sheet is adhered to the adhesive strip.

In some embodiments, the adhesive strip is black.

In some embodiments, a material of the adhesive strip includes polyethylene terephthalate.

In some embodiments, a difference between an expansion-contraction ratio of the material of the adhesive strip and that of the material of the diffusion sheet is within 10%.

In some embodiments, an expansion-contraction ratio of the material of the adhesive strip is substantially the same as that of the material of the diffusion sheet.

In some embodiments, only one edge of the light exit surface is provided with the adhesive strip.

The present application also provides a backlight comprising the above optical assembly, wherein a side of the upper prism sheet distal to the diffusion sheet is provided with a light shielding tape.

In some embodiments, the light shielding tape adheres the adhesive strip adhered to the diffusion sheet, the protrusion of the lower prism sheet, and the side of the upper prism sheet distal to the light exit surface.

The present application also provides a display device comprising the backlight described above.

DETAILED DESCRIPTION

Embodiments of the present disclosure will be described below with reference to the accompanying drawings. Obviously, the described embodiments are merely some but not all of embodiments of the present disclosure. All other embodiments obtained by a person skilled in the art based on the embodiments of the present disclosure without creative efforts shall fall into the protection scope of the present disclosure.

In a conventional backlight, sizes of the diffusion sheet, the lower prism sheet, and the upper prism sheet generally become smaller gradually, and after the diffusion sheet, the lower prism sheet and the upper prism sheet being stacked, sides of the three sheets close to a flexible circuit board of a light bar are not at a same height, and the thickness of the flexible circuit board is greater than a total thickness of the diffusion sheet, the lower prism sheet and the upper prism sheet, thus the diffusion sheet and the lower prism sheet are difficult to be fixed by a light shielding tape, therefore the diffusion sheet, the lower prism sheet and the upper prism sheet are easily displaced.

Figure 1:
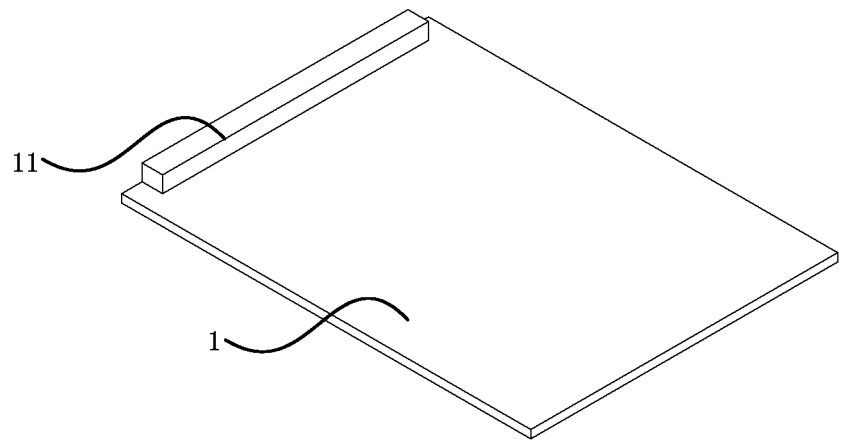
FIG. 1 is a schematic structural diagram of a diffusion sheet in an optical assembly according to an embodiment of the present disclosure.

Referring to FIG. 1 to FIG. 5, the present disclosure provides an optical assembly including a diffusion sheet 1, a lower prism sheet 2, and an upper prism sheet 3 that are sequentially stacked. Referring to FIG. 1, a surface of the diffusion sheet 1 facing the lower prism sheet 2 is a light exit surface, and at least one edge of the light exit surface is provided with an adhesive strip 11, and a side surface of the lower prism sheet 2 facing the adhesive strip 11 is provided with at least one protrusion 21. A side surface of the protrusion 21 cooperates with the surface of the lower prism sheet 2 facing the adhesive strip 11 to form an avoidance slot 22, so that the adhesive strip 11 passes through the lower prism sheet 2 in the thickness direction of the lower prism sheet 2. An orthographic projection of the upper prism sheet 3 on the light exit surface does not overlap with the orthographic projection of the adhesive strip 11 on the light exit surface, and the orthographic projection of the upper prism sheet 3 on the light exit surface does not overlap the orthographic projection of the protrusion 21 on the light exit surface.

In the above optical assembly, the diffusion sheet 1, the lower prism sheet 2 and the upper prism sheet 3 are sequentially stacked. A surface of the diffusion sheet 1 facing the lower prism sheet 2 serves as a light exit surface, and at least one edge of the light exit surface is provided with an adhesive strip 11. A side surface of the lower prism sheet 2 facing the adhesive strip 11 is provided with at least one protrusion 21, the side surface of the protrusion 21 cooperates with the surface of the lower prism sheet 2 facing the adhesive strip 11 to form a avoidance slot 22, that is, the lower prism sheet 2 is arranged on a side at the light exit surface of the diffusion sheet 1 by means of cooperation of the avoidance slot 22 with the adhesive strip 11. Since the adhesive strip 11 passes through the lower prism sheet 2 in the thickness direction of the lower prism sheet 2, and the orthographic projection of the upper prism sheet 3 on the light exit surface does not overlap with the orthographic projection of the adhesive strip 11 on the light exit surface, both the upper prism sheet 3 and the lower prism sheet 2 do not overlap with the adhesive strip 11. In some embodiments, the thickness of the adhesive strip 11 is not less than the thickness of the lower prism sheet 2. Furthermore, the thickness of the adhesive strip 11 may be equal to a sum of the thicknesses of the lower prism sheet 2 and the upper prism sheet 3. A side of the adhesive strip 11 distal to the light exit surface of the diffusion sheet 1 can be adhered by a light shielding tape 12. Since the orthographic projection of the upper prism sheet 3 on the light exit surface does not overlap with the orthographic projection of the protrusion 21 on the light exit surface, the upper prism sheet 3 does not overlap with the protrusion 21 of the lower prism sheet 2. That is, the lower prism sheet 2 is not completely covered by the upper prism sheet 3, and a side of the protrusion 21 distal to the light exit surface of the diffusion sheet 1 may be adhered by the light shielding tape 12. In summary, the light shielding tape 12 can adhere the adhesive strip 11 adhered to the diffusion sheet 1, the protrusion 21 of the lower prism sheet 2 and the side of the upper prism sheet 3 distal to the light exit surface, so as to fix positions of the diffusion sheet 1, the lower prism sheet 2 and the upper prism sheet 3. Since the thickness of the adhesive strip 11 is not less than the thickness of the lower prism sheet 2, a distance between a surface of the upper prism sheet 3 distal to the light exit surface and a surface of the adhesive strip 11 distal to the light exit surface is small, therefore, in a case where the optical assembly of the present disclosure is adhered by the light shielding tape 12, the diffusion sheet 1, the lower prism sheet 2, and the upper prism sheet 3 have high stability.

In some embodiments, in the optical assembly provided by the present disclosure, the thickness of the adhesive strip 11 may be equal to the sum of the thicknesses of the lower prism sheet 2 and the upper prism sheet 3. That is, the surface of the adhesive strip 11 distal to the light exit surface of the diffusion sheet 1 and the surface of the upper prism sheet 3 distal to the light exit surface are set substantially in a same plane, so that the light shielding tape 12 can adhere the diffusion sheet 1 adhered with the adhesive strip 11, the upper prism sheet 3 and the lower prism sheet 2, thus their positions can be fixed with each other, thereby preventing displacement of films and light leakage caused by the reliability test (high temperature, high humidity, transportation, drop, etc.).

Therefore, the above-mentioned optical assembly can prevent displacement of films and light leakage caused by the reliability test (high temperature, high humidity, transportation, drop, etc.).

Figure 2:
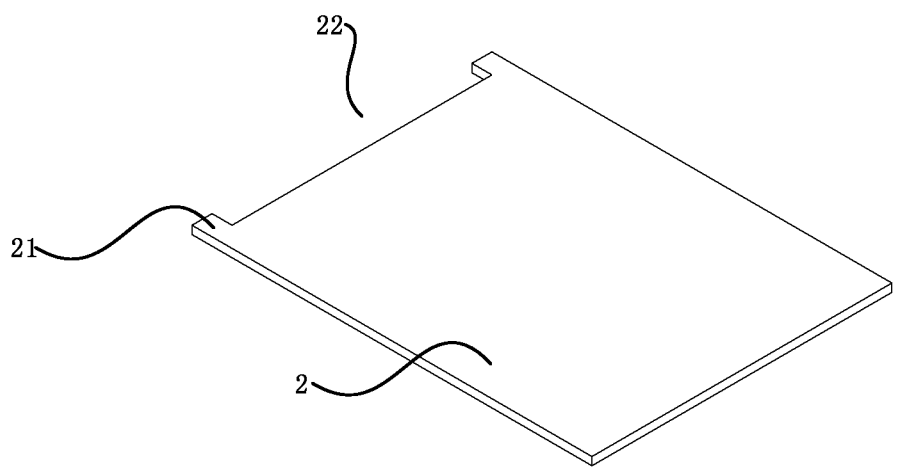
FIG. 2 is a schematic structural diagram of a lower prism sheet in an optical assembly according to an embodiment of the present disclosure.
Figure 3:
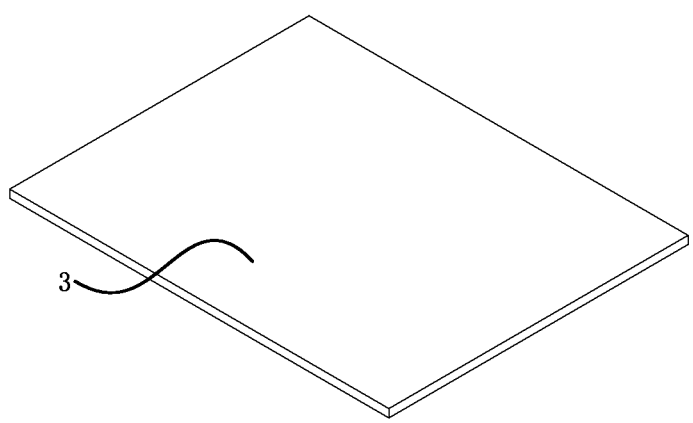
FIG. 3 is a schematic structural diagram of an upper prism sheet in an optical assembly according to an embodiment of the present disclosure.
Figure 4:
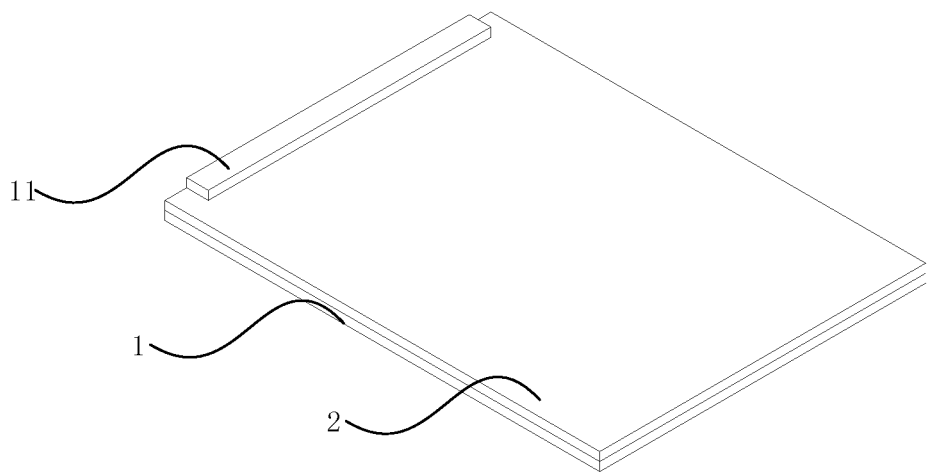
FIG. 4 is a schematic structural diagram of a combination of a lower prism sheet and a diffusion sheet in an optical assembly according to an embodiment of the present disclosure.

In some embodiments, referring to FIG. 2 and FIG. 4, two protrusions 21 may be provided, and inner side surfaces of the two protrusions 21 facing each other cooperate with the surface of the lower prism sheet 2 facing the adhesive strip 11 to form an avoidance slot 22.

The number of protrusions 21 is increased in this embodiment, so that adhering area of the light shielding tape 12 with the lower prism sheet 2 is increased when adhering the diffusion sheet 1, the lower prism sheet 2, and the upper prism sheet 3, thereby improving the structural stability of the optical assembly in the present disclosure.

In some embodiments, the adhesive strip 11 may be adhered to opposite surfaces of the two protrusions 21 and the surface of the lower prism sheet 2 facing the adhesive strip 11.

In some embodiments, the adhesive strip 11 may be a multi-faced tape, and may adhere the inner side surfaces of the two protrusions 21 and the surface of the lower prism sheet 2 facing the adhesive strip 11, which form the avoidance slot 22. This enhances the stability of the relative positions of the diffusion sheet 1 and the lower prism sheet 2 and can prevent the displacement of films due to the reliability test (high temperature, high humidity, transportation, drop, etc.).

Figure 5:
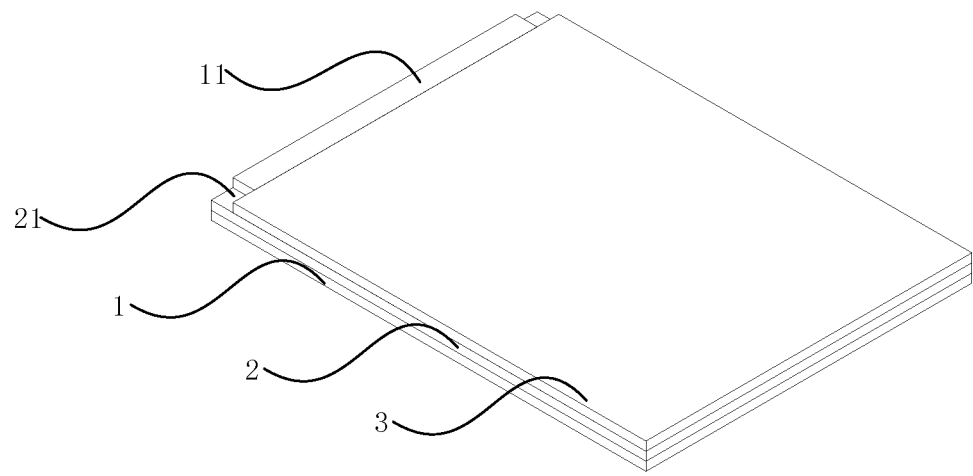
FIG. 5 is a schematic structural diagram of an optical assembly according to an embodiment of the present disclosure.
Figure 6:
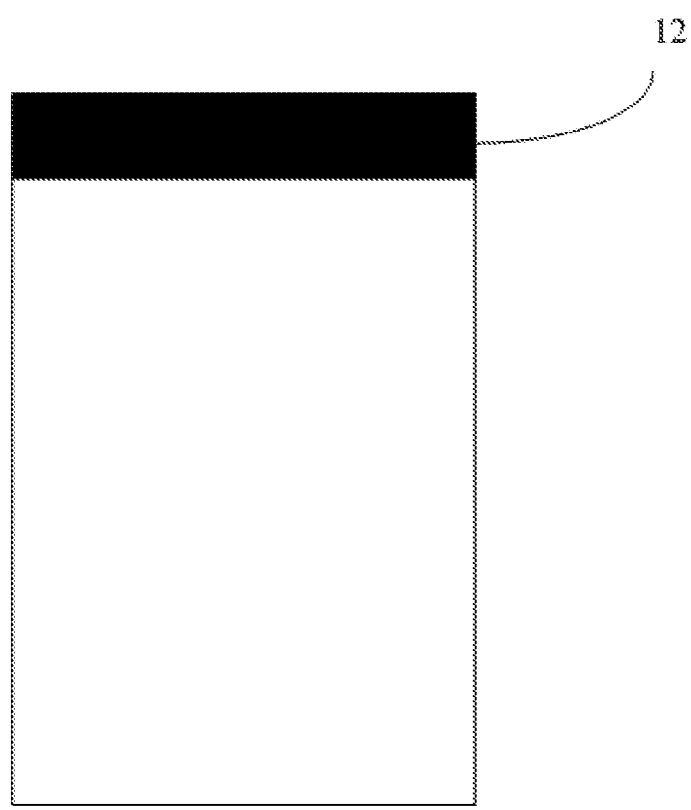
FIG. 6 is a top view of an optical assembly according to an embodiment of the present disclosure.

In some embodiments, referring to FIG. 5, a top surface of the adhesive strip 11 is substantially flush with the surface of the upper prism sheet 3 distal to the diffusion sheet 1.

The structure eliminates the distance difference between the top surface of the adhesive strip 11 and the surface of the upper prism sheet 3 distal to the diffusion sheet 1, so that the light shielding tape 12 can adhere the upper prism sheet 3 and the adhesive strip 11 substantially in a same plane. The adhesive strip 11 and the surface of the upper prism sheet 3 distal to the diffusion sheet 1 are substantially set in a same plane so that the light shielding tape 12 can adhere the diffusion sheet 1 adhered with the adhesive strip 11, the upper prism sheet 3, and the lower prism sheet 2 as much as possible, thereby fixing the relative positions of diffusion sheet 1, the upper prism sheet 3 and the lower prism sheet 2 to prevent displacement of the films and light leakage caused by the reliability test (high temperature, high humidity, transportation, drop, etc.).

In some embodiments, a side surface of the upper prism sheet 3 is adhered to the adhesive strip 11.

This structure enhances the position stability between the upper prism sheet 3 and the diffusion sheet 1, thereby enhancing the position stability between the adhesive strip 11 and the upper prism sheet 3, the lower prism sheet 2, and enhancing the stability of the optical assembly provided by the present disclosure.

In some embodiments, the adhesive strip 11 is black in color.

The black adhesive strip 11 may play a role of preliminary shielding light passing through the projection area of the adhesive strip 11 on the diffusion sheet 1 so as to enhance the light shielding effect of the light shielding tape and enhance the light shielding effect of the optical assembly provided by the present disclosure after adhering the light shielding tape, resulting in a reduction of possibility of bright lines.

In some embodiments, the material of the adhesive strip 11 may be polyethylene terephthalate.

The black polyethylene terephthalate adhesive strip 11 provided on the light exit surface of the diffusion sheet 1 can improve the light incoming effect of the product.

In some embodiments, a difference between the expansion-contraction ratio of the material of the adhesive strip 11 and the expansion-contraction ratio of the material of the diffusion sheet 1 may be within 10%.

In some embodiments, the expansion-contraction ratio of the material of the adhesive strip 11 may be the same as that of the material of the diffusion sheet 1.

In a case where the expansion-contraction ratio of the material of the adhesive strip 11 is the same as that of the material of the diffusion sheet 1, after the reliability test, the expansion-contraction amount of the adhesive strip 11 and the expansion-contraction amount of the diffusion sheet 1 are the same with each other, which makes the diffusion sheet 1 can still expand and contract freely with the external conditions in a case where the diffusion sheet 1 is fixed, without occurrence of wave distortion.

In some embodiments, only one edge of the light exit surface is provided with the adhesive strip 11.

One edge of the light exit surface of the diffusion sheet 1 is provided with an adhesive strip 11, and the other three edges of the diffusion sheet 1 not provided with the adhesive strip 11 are not limited. Since expansion and contraction of the above-mentioned three edges are not limited, after the high-temperature and high-humidity test, the diffusion sheet 1 will not undergo wave deformation. This allows the films to expand and contract freely with changes in external conditions in a case where the films are fixed.

The present disclosure also provides a backlight including any optical assembly provided in the above technical solutions. In the optical assembly, a light shielding tape 12 is provided on a side of the upper prism sheet 3 distal to the diffusion sheet 1.

In the backlight provided by the present disclosure, the surface of the adhesive strip 11 distal to the light exit surface of the diffusion sheet 1 and the surface of the upper prism sheet 3 distal to the light exit surface of the diffusion sheet 1 are substantially set in a same plane, so that the light shielding tape adheres the diffusion sheet 1 adhered with the adhesive tape 11, the upper prism sheet 3 and the lower prism sheet 2, so that their positions can be fixed with each other, thereby preventing displacement of films and light leakage caused by the reliability test (high temperature, high humidity, transportation, drop, etc.).

The present disclosure also provides a display device including any backlight provided in the above technical solution.

It should be understood that, the foregoing embodiments are only exemplary embodiments used for explaining the principle of the present disclosure, but the present disclosure is not limited thereto. Various variations and improvements may be made by a person skilled in the art without departing from the spirit and essence of the present disclosure, and these variations and improvements also fall into the protection scope of the present disclosure.

The invention claimed is:

1. An optical assembly, comprising a diffusion sheet, a lower prism sheet and an upper prism sheet stacked sequentially, a surface of the diffusion sheet facing the lower prism sheet serving as a light exit surface, wherein at least one edge of the light exit surface is provided with an adhesive strip, a side surface of the lower prism sheet facing the adhesive strip is provided with at least one protrusion, a side surface of the protrusion cooperates with the surface of the lower prism sheet facing the adhesive strip to form an avoidance slot, so that the adhesive strip passes through the lower prism sheet in a thickness direction of the lower prism sheet; an orthographic projection of the upper prism sheet on the light exit surface does not overlap with an orthographic projection of the adhesive strip on the light exit surface, and the orthographic projection of the upper prism sheet on the light exit surface does not overlap with an orthographic projection of the protrusion on the light exit surface.

2. The optical assembly of claim 1, wherein the at least one protrusion includes two protrusions, and opposite side surfaces of the two protrusions cooperate with the surface of the lower prism sheet facing the adhesive strip to form the avoidance slot.

3. The optical assembly of claim 2, wherein the adhesive strip is adhered to the opposite side surfaces of the two protrusions and the surface of the lower prism sheet facing the adhesive strip.

4. The optical assembly of claim 3, wherein a top surface of the adhesive strip is substantially flush with a surface of the upper prism sheet distal to the diffusion sheet.

5. The optical assembly of claim 4, wherein a side of the upper prism sheet distal to the diffusion sheet is provided with a light shielding tape.

6. The optical assembly of claim 5, wherein the light shielding tape adheres the adhesive strip, the protrusions of the lower prism sheet, and the side of the upper prism sheet distal to the light exit surface.

7. The optical assembly of claim 1, wherein a side surface of the upper prism sheet is adhered to the adhesive strip.

8. The optical assembly of claim 1, wherein the adhesive strip is black.

9. The optical assembly of claim 8, wherein a material of the adhesive strip comprises polyethylene terephthalate.

10. The optical assembly of claim 1, wherein a difference between an expansion-contraction ratio of the material of the adhesive strip and that of the material of the diffusion sheet is within 10%.

11. The optical assembly of claim 1, wherein an expansion-contraction ratio of the material of the adhesive strip is substantially the same as that of the material of the diffusion sheet.

12. The optical assembly of claim 1, wherein only one edge of the light exit surface is provided with the adhesive strip.

13. A backlight comprising the optical assembly of claim 1, wherein a side of the upper prism sheet distal to the diffusion sheet is provided with a light shielding tape.

14. The backlight of claim 13, wherein the light shielding tape adheres the adhesive strip, the protrusion of the lower prism sheet, and the side of the upper prism sheet distal to the light exit surface.

15. A display device comprising the backlight of claim 13.

* * * * *